United States Patent
Kershaw et al.

[11] Patent Number: 5,997,261
[45] Date of Patent: Dec. 7, 1999

[54] PUMP MOTOR HAVING FLUID COOLING SYSTEM

[75] Inventors: Peter A. Kershaw; Marek Horski; Jerzy Muszynski, all of London, Canada

[73] Assignee: Siemens Canada Limited, Mississauga, Canada

[21] Appl. No.: 08/961,688

[22] Filed: Oct. 31, 1997

[51] Int. Cl.[6] .................................................... F04B 39/06
[52] U.S. Cl. ....................... 417/366; 417/357; 417/370; 310/54; 310/86
[58] Field of Search .................................. 417/357, 366, 417/310, 423.8, 423.12; 403/326, 329; 415/115, 176, 180; 310/54, 59, 86, 87

[56] References Cited

U.S. PATENT DOCUMENTS

| | | |
|---|---|---|
| 2,809,590 | 10/1957 | Brown . |
| 2,871,791 | 2/1959 | Litzenberg . |
| 2,925,041 | 2/1960 | Sigmund . |
| 2,939,399 | 6/1960 | Rutschi . |
| 3,118,384 | 1/1964 | Sence et al. . |
| 3,135,211 | 6/1964 | Pezzillo ................................. 417/357 |
| 3,220,349 | 11/1965 | White ..................................... 417/357 |
| 3,220,350 | 11/1965 | White . |
| 3,225,698 | 12/1965 | Spisiak ................................... 417/357 |
| 3,288,073 | 11/1966 | Pezzillo . |
| 3,588,290 | 6/1971 | Kreutzkampf . |
| 3,644,067 | 2/1972 | Yowell . |
| 4,013,384 | 3/1977 | Oikawa . |
| 4,047,847 | 9/1977 | Oikawa . |
| 4,644,202 | 2/1987 | Kroy et al. . |
| 4,652,218 | 3/1987 | Tsutsui et al. . |
| 4,684,329 | 8/1987 | Hashimoto . |
| 4,890,988 | 1/1990 | Kramer et al. . |
| 4,998,865 | 3/1991 | Nakanishi et al. ...................... 417/366 |
| 5,118,466 | 6/1992 | Raymond et al. . |
| 5,248,245 | 9/1993 | Behnke et al. . |
| 5,306,972 | 4/1994 | Hokanson et al. . |
| 5,332,369 | 7/1994 | Jensen . |
| 5,365,132 | 11/1994 | Hann et al. . |
| 5,592,039 | 1/1997 | Guardiani . |
| 5,785,013 | 7/1998 | Sinn et al. ............................... 417/366 |

FOREIGN PATENT DOCUMENTS

| | | |
|---|---|---|
| 488444 | 11/1952 | Canada . |
| 156850 | 12/1961 | U.S.S.R. . |
| 688311 | 9/1950 | United Kingdom . |

*Primary Examiner*—Timothy S. Thorpe
*Assistant Examiner*—Cheryl J. Tyler

[57] ABSTRACT

A brushless water pump motor includes a pump housing having an impeller chamber with an impeller disposed therein, and a motor assembly coupled at a first end thereof to the pump housing. The motor assembly includes a stator assembly having laminations and windings, the stator having an interior portion defining a rotor chamber in which a rotor assembly is disposed. There is a partition structure provided between the rotor assembly and the stator assembly for isolating the stator assembly from the rotor chamber, and the partition structure has a wall in communication with the rotor chamber. The pump/motor assembly further includes a hollow shaft in communication with the rotor chamber, such that the rotor assembly and impeller are mounted on the hollow shaft. A bearing structure is operatively associated with the hollow portion of the shaft for supporting the shaft for rotational movement. The pump motor further includes an electronic control unit coupled to a second end of the motor assembly and has an upper surface in communication with the rotor chamber. A fluid flow path structure is arranged to permit fluid to pass from a high pressure portion of the impeller chamber to enter the rotor chamber to submerge the rotor assembly in the fluid and fluid may contact the upper surface of the electronic control unit to cool the electronic control unit. By contacting the wall of the partition structure, the fluid cools the laminations and windings, and by entering the hollow portion of the shaft, the fluid cools the bearing structure.

24 Claims, 5 Drawing Sheets

5,997,261

PUMP MOTOR HAVING FLUID COOLING SYSTEM

FIELD OF THE INVENTION

The present invention relates to a pump motor having a rotary pump for water or other liquid and an electric motor for driving the pump which has fluid flow passages therein to cool certain areas of the motor.

BACKGROUND OF THE INVENTION

Water pump motors of the dry winding set type typically include a rotor mounted in a rotor chamber and a stator assembly, having laminations and a winding set, operatively associated with the rotor assembly. The rotor assembly shares a bearing-supported shaft with an impeller of the pump. Water pump motors generally have some type of cooling to extend the operating capability thereof. In general, it is desirable to maintain the temperature of such devices below a predetermined limit in order to prevent deterioration of the device through thermal breakdown or distortion due to thermal expansion of elements of the device. In certain pump motors, the stator assembly is isolated from the rotor chamber such that fluid from the pump may enter the rotor chamber, submerge the rotor, and cool the bearings and stator assembly by heat exchange with the fluid, without the fluid contacting the winding set of the stator assembly.

Water pump motors for use in todays automobiles are electronically controlled and generally have an electronic control unit electrically coupled to the winding set of the motor. The electronic control unit generates heat that may limit the operating temperature of the pump motor. Thus, there is a need to provide cooling not only of the bearings and stator assembly of the device, but also of the electronic control unit thereof.

SUMMARY OF THE INVENTION

An object of the present invention is to fulfill the need referred to above. In accordance with the principles of the present invention, this objective is obtained by providing a water pump motor including a pump housing having an impeller chamber, an impeller in the impeller chamber and a motor assembly coupled to the pump housing. The motor assembly includes a stator assembly having laminations and windings. The stator has an interior portion defining a rotor chamber with a rotor assembly disposed in the rotor chamber. Partition structure is provided between the rotor assembly and the stator assembly for isolating the stator assembly from the rotor chamber. The partition structure includes a wall in open communication with the rotor chamber. A shaft is provided on which the rotor assembly and impeller are mounted. The shaft includes a hollow portion in open communication with the rotor chamber. Bearing structure is operatively associated with the hollow portion of the shaft for supporting the shaft for rotational movement.

The pump motor includes an electronic control unit coupled to the motor assembly. The electronic control unit has an upper surface in communication with the rotor chamber. Fluid flow path structure is constructed and arranged to permit fluid to pass from a high pressure portion of the impeller chamber to enter the rotor chamber so that the rotor assembly may be submerged in the fluid and fluid may contact the upper surface of the electronic control unit to cool the electronic control unit. Fluid may also contact the wall of the partition structure such that the wall is in heat exchange relation with the fluid to cool the laminations and the windings. Fluid may also enter the hollow portion of the shaft to cool the bearing structure. Fluid return structure is provided for returning fluid in the rotor chamber to a low pressure portion of the impeller chamber.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE PRESENTLY PREFERRED EXEMPLARY EMBODIMENTS

Figure 1:
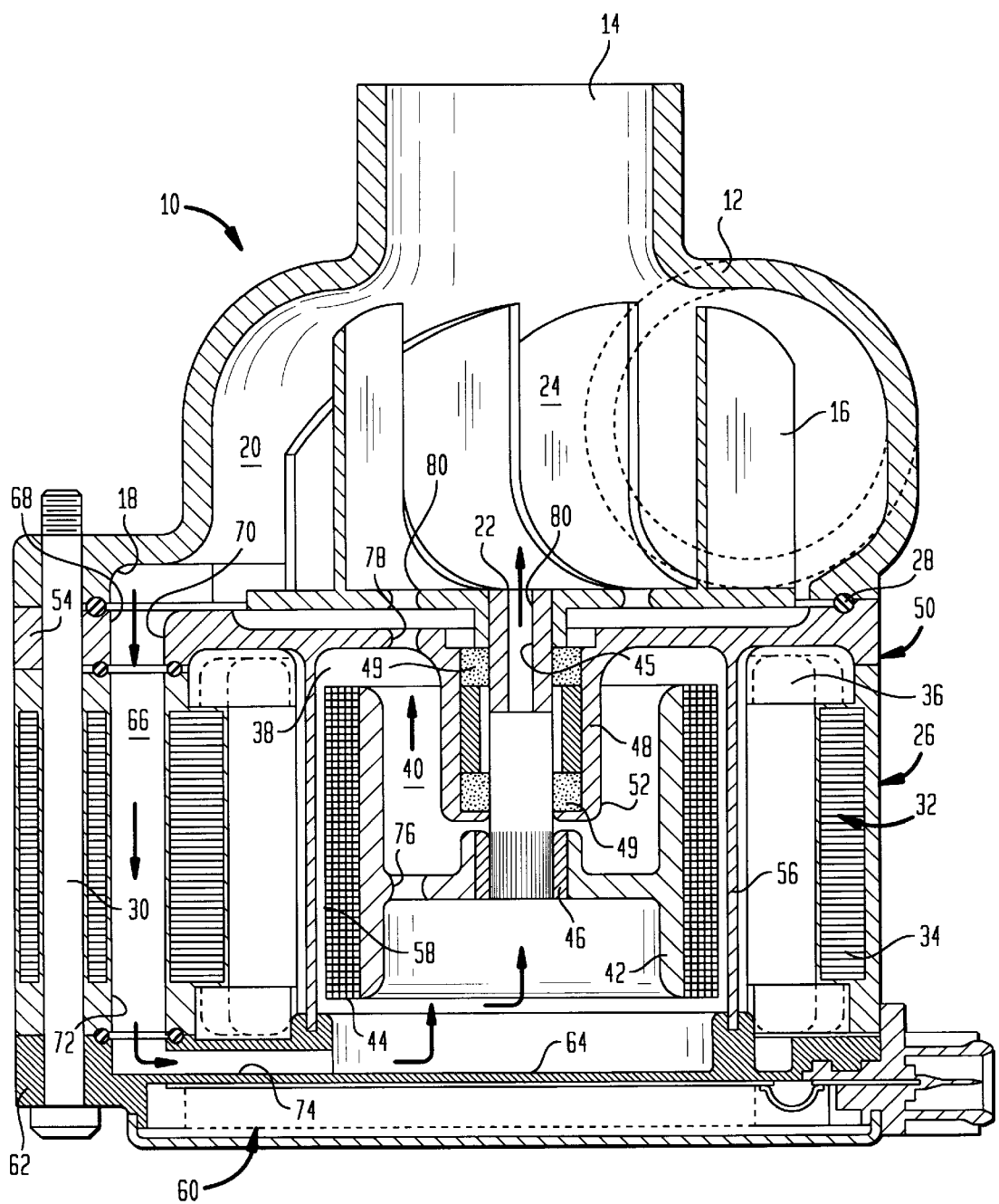
FIG. 1 is a sectional view of a water pump motor provided in accordance with the principles of the present invention.

Referring to the drawings, a brushless d.c. water pump motor of the dry winding set type is shown generally indicated at 10 in FIG. 1, which embodies the principles of the present invention.

The water pump motor 10 includes a pump housing 12 defining an impeller chamber 14. An impeller 16 is disposed in the impeller chamber 14. The pump housing and impeller may be of any conventional type having an exit 18 at an outer or high pressure portion 20 of the impeller chamber 14, and an inlet to 22 at a low pressure portion 24 of the impeller chamber 14.

A motor assembly, generally indicated at 26, is coupled at a first end 28 thereof to the pump housing 12 via bolting 30. The motor assembly 26 includes a stator assembly, generally indicated at 32, having the conventional laminations 34 and windings 36. The stator assembly has an interior portion 38 defining a rotor chamber 40. A rotor assembly 42 is disposed in the rotor chamber 40. The rotor assembly 42 has the conventional magnets 44 mounted on the outer peripheral portion thereof. As shown in FIG. 1, a shaft 46 is provided on which the rotor assembly 42 and impeller 16 are mounted. The shaft 46 is hollow and thus fluidly communicates the rotor chamber 40 with the impeller chamber 14 via passage 45 therethrough. The shaft 46 is mounted for rotation via bearing structure 48 that is operatively associated with the shaft 46 for supporting the hollow shaft 46 for rotational movement. In the illustrated embodiment, the bearing structure 48 includes bearings 49. As shown in FIG. 1, the bearings 49 are housed in a bearing housing, generally indicated at 50, which includes a boss portion 52, and a generally disk-shaped portion 54 which is coupled to the impeller housing 12. The bearing housing 50 also includes a cylindrical portion 56 that defines partition structure between the magnets of the rotor assembly 42 and the stator assembly 32 so as to isolate the stator assembly 32 from the rotor chamber 40, the function of which will become more apparent below. The partition structure 56 thus has an annular wall 58 that communicates with the rotor chamber 40.

An electronic control unit 60 containing the circuitry to operate the water 5 pump motor 10 is electrically coupled electrically to a second end 62 of the motor assembly 26 (in particular, to the stator assembly) and has an upper surface 64 in communication with the rotor chamber 40. Surface 64 may be part of a heat sink of the electronic control unit 60.

In accordance with the principles of the invention, fluid flow path structure, generally indicated at 66, is provided to permit fluid to pass from the high pressure portion 20 of the impeller chamber 14 to an inlet 68 of the motor assembly 26 and enter the rotor chamber 40 so that the rotor assembly 42 may be submerged in fluid and fluid may contact the upper surface 64 of the electronic control unit 60 to cool the electronic control unit. Further, the fluid may contact wall 58 to be in heat transfer relation with the wall 58 to provide cooling of the laminations 34 and windings 36. In addition, fluid may enter the hollow shaft 46 and be in heat transfer relation therewith to cool the bearing structure 48.

In the embodiment of FIG. 1, the fluid flow path structure 66 includes at least one passage 70 in the bearing housing 50 which communicates with a passage 72 defined through the laminations 34 of the stator assembly 32. Passage 72 communicates with a port 74 defined in the electronic control unit 60. The port 74 is in open fluid communication with the upper surface 64 of the electronic control unit 60 and thus in communication with the rotor chamber 40. As shown by the arrows in FIG. 1, fluid may flow from the high pressure portion 20 of the impeller chamber 14 through the inlet 68 of the motor assembly 26 and through the passage 70 in the bearing housing, through the passage 72 in the laminations, to the port 74 in the electronic unit control 60 and into the rotor chamber 40. As a result, the rotor assembly 42 is submerged in the fluid and fluid contacts the wall 58 which transfers heat generated by the laminations 34 and windings 36 to the fluid. Fluid also contacts the upper surface 64 of the electronic control unit 60 to cool the same. In addition, fluid may pass through the passages 76 in the rotor assembly 42 and may flow through passage 45 of the hollow shaft 46. Passages 78 in the bearing housing 50 and/or the passage 45 through the hollow shaft 46 define fluid return structure for directing fluid through outlets 80 of the motor assembly 26 and thus returning fluid to the low pressure portion 24 of the impeller chamber 14.

Figure 2:
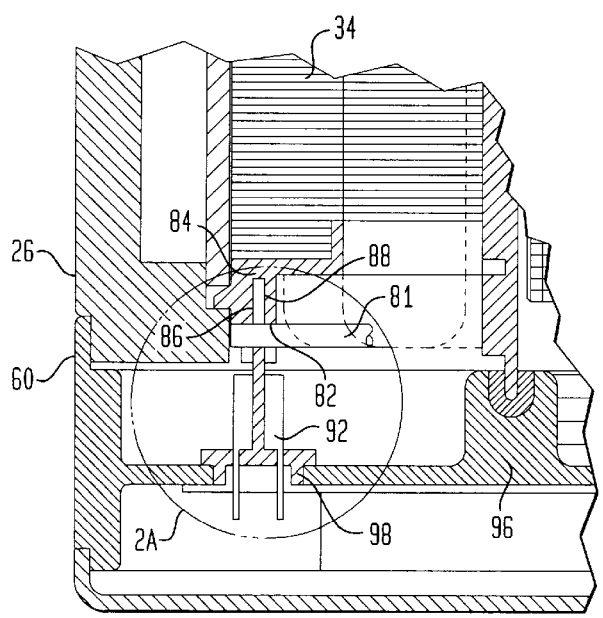
FIG. 2 is an enlarged, partial sectional view of an electrical connection to an electronic control unit of the pump motor of FIG. 1.
Figure 3:
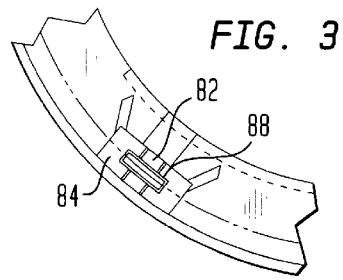
FIG. 3 is a view of a radial slot and axial slot location in a tab pocket.
Figure 4A:
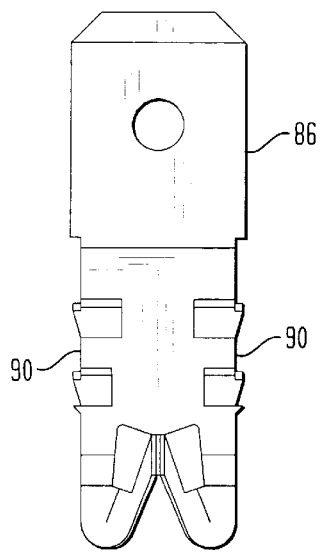
FIG. 4A is an enlarged front view of a locking tab provided in accordance with the invention.
Figure 4B:
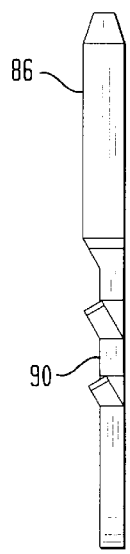
FIG. 4B is side view of the locking tab of FIG. 4A.

FIG. 2 is an enlarged sectional view of the electronic control unit dry connection. As a result of the coil winding operation, the coil starting wire (not shown) as well as ending wire 80 is placed into a radial slot 82 of a tab pocket 84. A locking tab 86 is press-fit into the axial slot 88 of the tab pocket 84. The radial slot 82 and the axial slot 88 are best shown in FIG. 3. This fit permits the inner edges of the tabs legs 90 (FIGS. 4A, 4B) to contact and hold the wire 80 in place. Electro-mechanical connection is thus achieved.

Figure 2A:
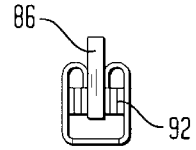
FIG. 2A is a plan view of a tab and socket connection of encircled portion B of FIG. 2.
Figure 5A:
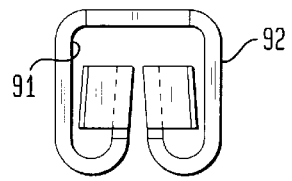
FIG. 5A is an enlarged top view of a socket provided in accordance with the present invention.
Figure 5B:
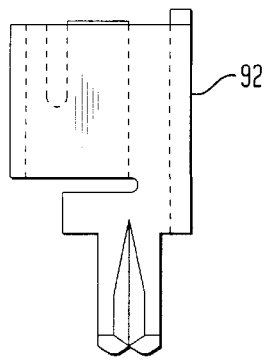
FIG. 5B is a side view of the socket of FIG. 5A.

Further, during the stator assembly 32-electronic control unit 60 assembly, the stator mounted locking tabs 86 are pressed into opening 91 in sockets 92 which are secured to the PCB 96 via insulating pad 98. A socket 92 is shown in detail in FIGS. 5A, 5B, and a top view of the tab-socket connection (portion B encircled in FIG. 2) is shown in FIG. 2A. This connection creates an electrical connection between the stator assembly 32 (winding set) and the electronic control unit 60.

Figure 6:
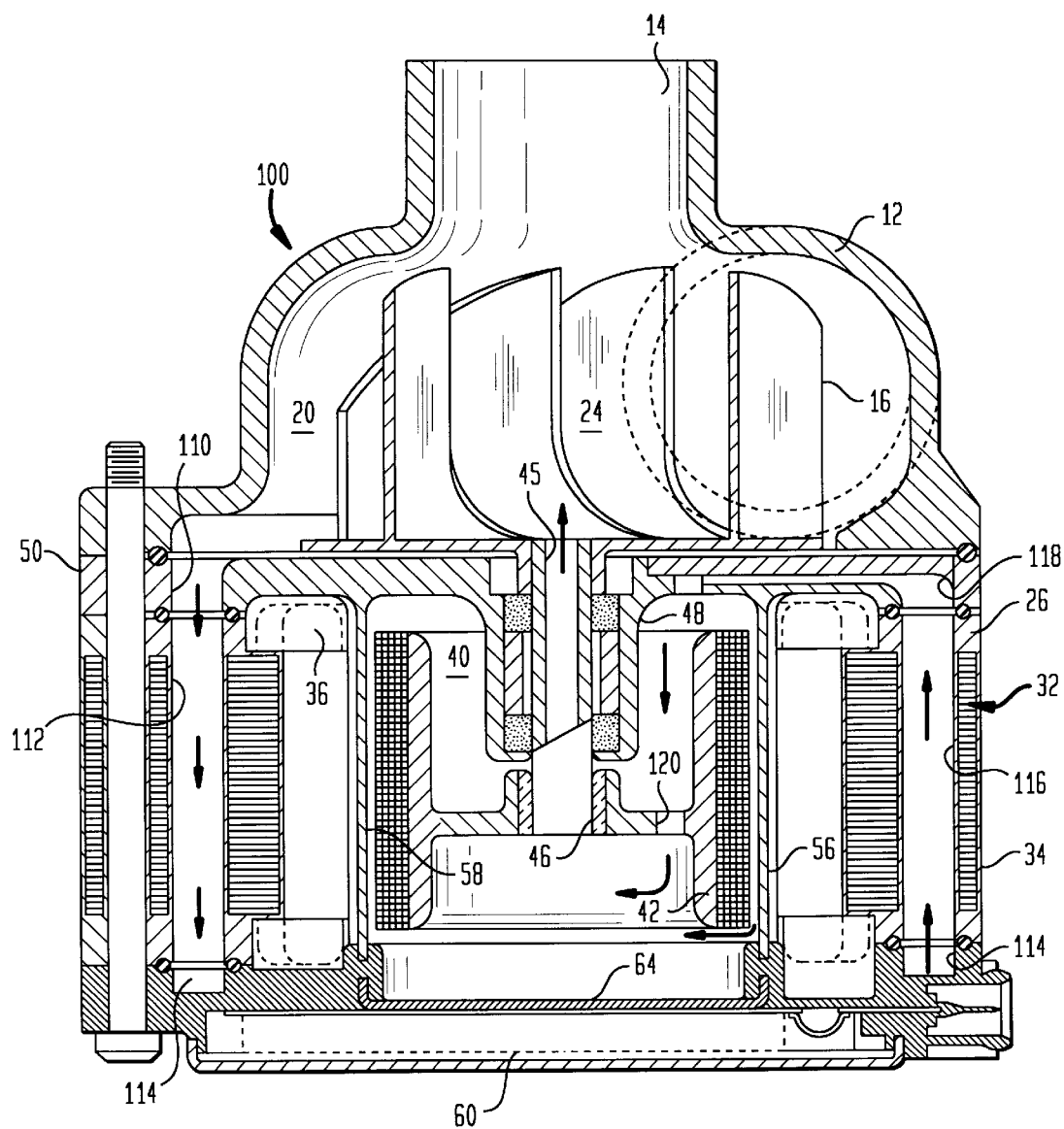
FIG. 6 is a sectional view of a second embodiment of the present invention.

FIG. 6 is a second embodiment of the present invention wherein like parts are given like numerals. The water pump motor 100 of FIG. 6 is similar to that of FIG. 1, but has different fluid flow path structure. The fluid flow path structure of this embodiment includes at least a first passage 110 through the bearing housing 50 which is in communication with a first passage 112 defined through the laminations 34 of the stator assembly 32. The first passage 112 in the laminations communicates with an annular water channel 114 defined in the electronic control unit 60. The water channel 114 communicates with a second passage 116 in the laminations 34 which in turn communicates with a second passage 118 defined by the bearing housing 50. The second passage 118 in the bearing housing 50 communicates with the rotor chamber 40. Thus, as shown by the arrows in FIG. 6, fluid may flow from the high pressure portion 20 of the impeller chamber 14 through the first passage 110 in the bearing housing 50, through the first passage 112 in the laminations 34 to the water channel 114 and into the second passage 116 in the laminations, cooling the laminations 34 and windings 36 by transferring heat from the walls defining the passages 112 and 116 to the fluid. Fluid then passes through the second passage 118 in the bearing housing 50 above the windings 36 and into the rotor chamber 40. Thus, fluid fills the rotor chamber 40 via passages 120 in the rotor assembly 42 such that the rotor assembly 42 is submerged and fluid contacts wall 58 of the partition structure 56 and contacts the upper surface 64 of the electronic control unit 60, cooling the laminations 34 and windings 36 and electronic control unit 60, respectively. Further, fluid flows through passage 45 in the hollow shaft 46 to the low pressure portion 24 of the impeller chamber 14.

Figure 7:
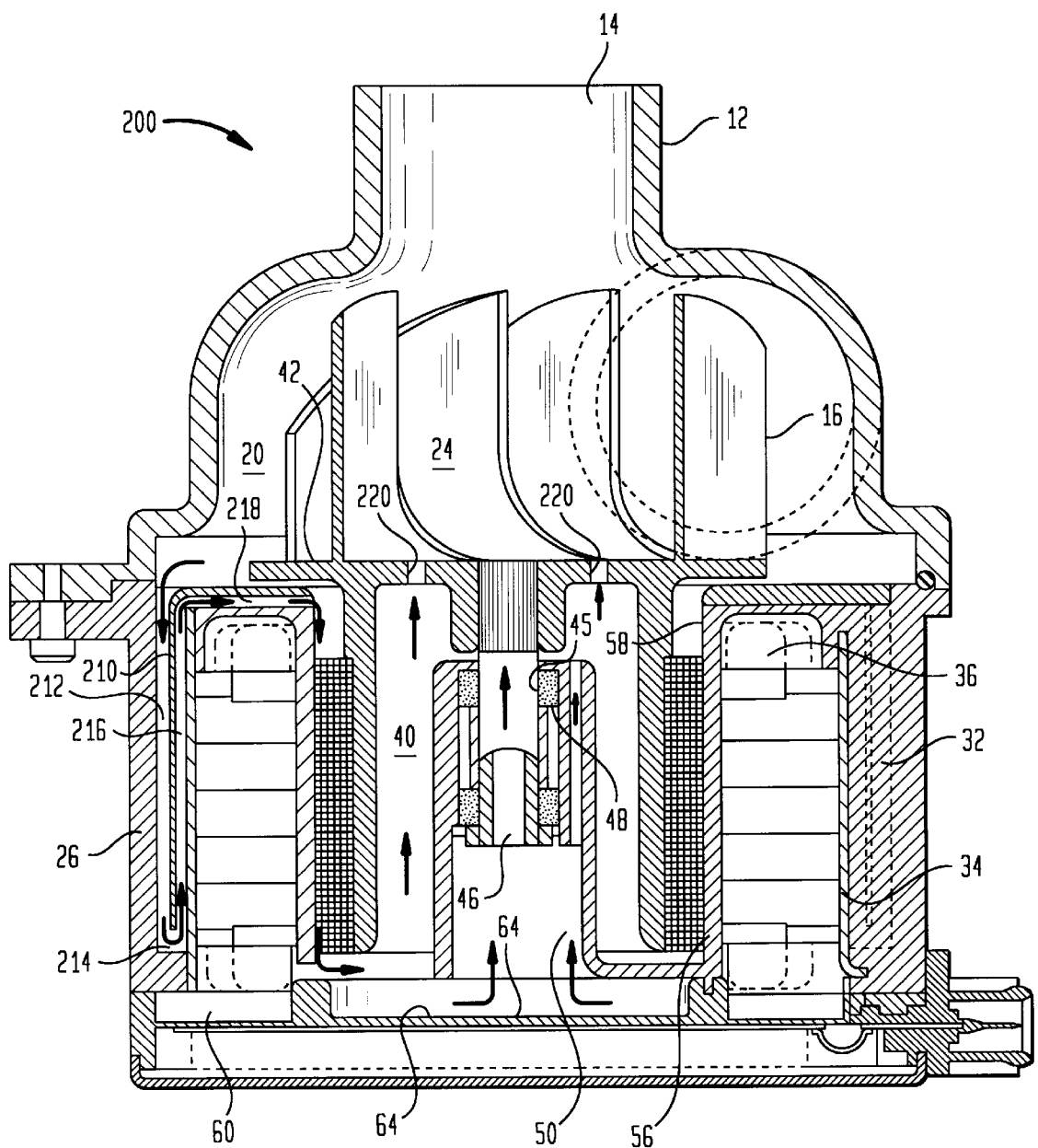
FIG. 7 is a sectional view of a third embodiment of the present invention.

FIG. 7 shows a third embodiment of the present invention. The water pump motor 200 of FIG. 7 is similar to that of FIG. 1, but has different fluid flow path structure. Further, the rotor assembly 42 is made integral with the impeller 16. As shown in FIG. 7, the motor assembly 26 includes a water jacket 210 adjacent to the stator assembly 32. The fluid flow path structure includes, in the water jacket 210, at a first passage 212 in communication with the high pressure portion 20 of the impeller chamber 14, an annular water channel 214 communicating with the first passage 212, and a second passage 216 generally adjacent to the stator assembly 32, in communication passage 218, and disposed above the windings 36. Passage 218 is in communication with the rotor chamber 40. Fluid return structure is provided which includes at least one passage 220 through the rotor assembly 42 providing communication between the rotor chamber 40 and the low pressure portion 24 of the impeller chamber 14. Alternatively, or in addition to providing passage 220, the passage 45 through the hollow shaft 46 may define fluid return structure. Thus, as shown by the arrows in FIG. 7, fluid may flow from the high pressure portion 20 of the impeller chamber 14 to the first passage 212, to the water channel 214, into the second passage 216 and passage 218, to be in heat exchange relation with the laminations 34 and windings 36 and then fluid flows into the rotor chamber 40. The rotor chamber 40 is filled with fluid and the rotor assembly 42 is submerged. Wall 58 of the partition structure 56 is in heat exchange relation with the fluid to further cool the laminations 34 and windings 36. In addition, fluid contacts the upper surface 64 of the electronic control unit 60 and flows into the hollow shaft 46 to cool the bearing structure 48. Fluid may then flow through the passages 200 in the rotor assembly and/or through the passage 45 in the hollow shaft 46 to return to the low pressure portion 24 of the impeller chamber 14.

Figure 8:
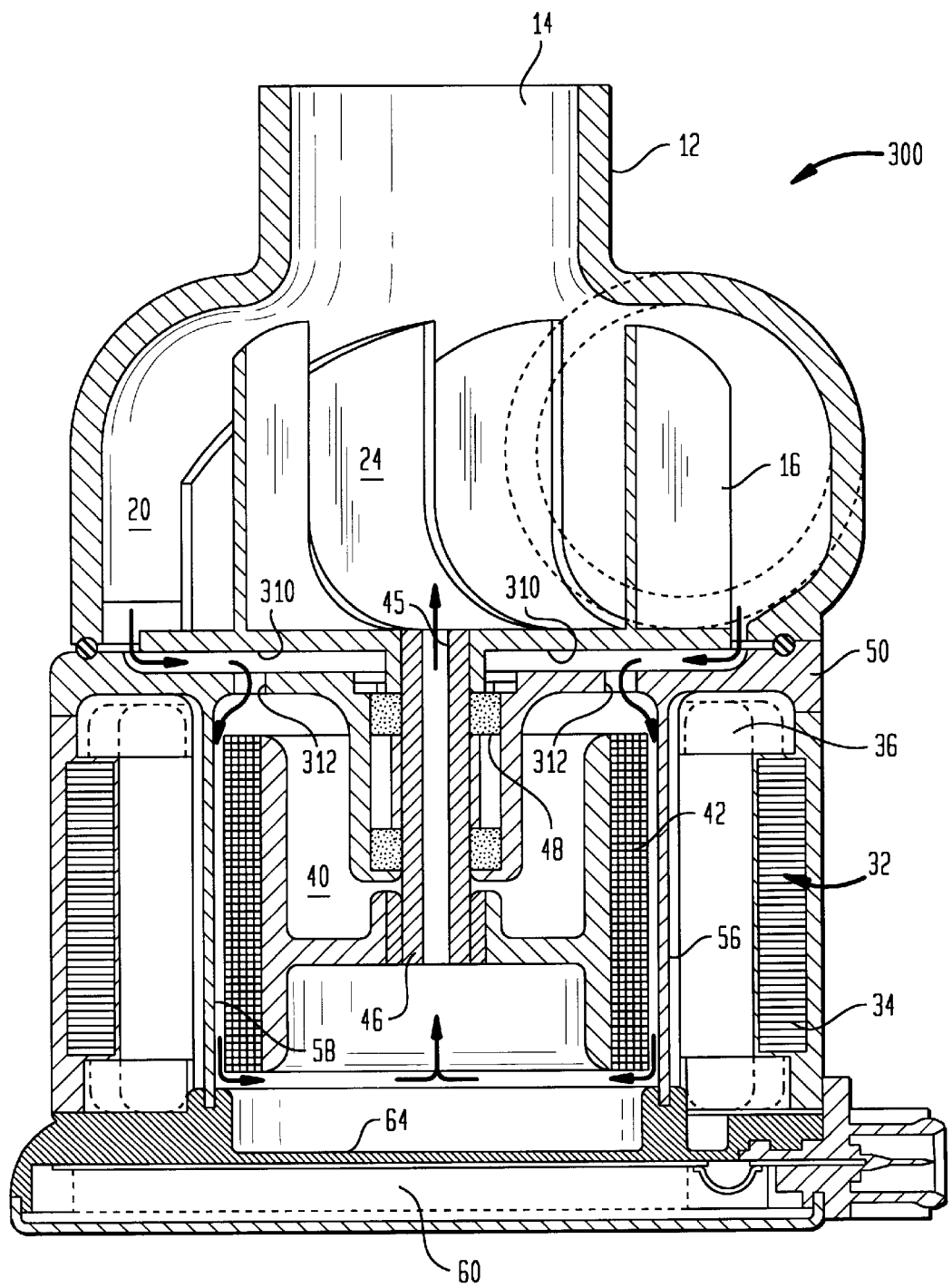
FIG. 8 is a sectional view of a fourth embodiment of the present invention.

FIG. 8 shows a fourth embodiment of the present invention. The water pump motor 300 of FIG. 8 is similar to FIG. 1, but has different flow path structure. As shown in FIG. 8, the fluid flow path structure includes a plurality of passages 310 and 312 in the bearing housing 50 providing fluid communication between the high pressure portion 20 of the impeller chamber 14 and the rotor chamber 40 such that fluid may enter the rotor chamber 40 such that the rotor assembly 42 is submerged in the fluid. Thus, fluid is in heat exchange relation with wall 58 of the partition structure 56 to provide cooling of the windings 36 and laminations 34. Further, fluid contacts the upper surface 64 of the electronic control unit 60 to cool the same. Fluid may then exit through the passage 45 in the hollow shaft 46 to return to the low pressure portion 24 of the impeller chamber 14.

Thus, it can be seen that the laminations, windings, bearing structure and the electronic control unit are cooled effectively by the circulating fluid. Due to the partition structure, the fluid in the rotor chamber is isolated from the stator assembly 32 such that the windings 36 thereof may remain dry, out of fluid contact.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

We claim:

1. A brushless pump motor comprising:
    a pump housing having an impeller chamber,
    an impeller in said impeller chamber,
    a motor assembly coupled to said pump housing, said motor assembly including:
        a stator assembly having laminations and windings, said stator assembly having an interior portion defining a rotor chamber,
        a rotor assembly in said rotor chamber,
        partition structure between said rotor assembly and said stator assembly for isolating said stator assembly from said rotor chamber, said partition structure including a wall in communication with said rotor chamber,
        a shaft on which said rotor assembly and impeller are mounted, said shaft including a hollow portion in open communication with said rotor chamber, and
        bearing structure operatively associated with the hollow portion of said shaft for supporting said shaft for rotational movement,
    an electronic control unit coupled to said motor assembly and having an upper surface in communication with said rotor chamber,
    fluid flow path structure constructed and arranged to permit fluid to pass from a high pressure portion of said impeller chamber and enter said rotor chamber so that said rotor assembly being submergible in the fluid and fluid contacts said upper surface of said electronic control unit to cool the electronic control unit, and fluid contacts said wall of the partition structure such that said wall is in heat exchange relation with the fluid to cool said laminations and said windings, and fluid enters said hollow portion of said shaft to cool said bearing structure, and
    fluid return structure for returning fluid in said rotor chamber to a low pressure portion of said impeller chamber.

2. The brushless pump motor according to claim 1, wherein a bearing housing houses said bearing structure, said bearing housing having a generally cylindrical wall portion, said rotor assembly being disposed in an interior portion defined by said cylindrical wall, said cylindrical wall defining said partition structure.

3. The brushless pump motor according to claim 2, wherein said hollow portion of said shaft is in open communication with said low pressure portion of said impeller chamber thereby defining said fluid return structure,
    and said flow path structure includes at least one passage through said bearing housing in communication with a passage through said laminations of said stator assembly that communicates with a port in said electronic control unit, said port being in open communication with said upper surface and thus with said rotor chamber,
    whereby fluid flows from the high pressure portion of the impeller chamber and through said passage in said bearing housing, through said passage in the laminations to said port and into said rotor chamber to contact said wall of the partition structure and the upper surface of said electronic control unit, and fluid passes to said hollow portion of said shaft and to said low pressure portion of said impeller chamber.

4. The brushless pump motor according to claim 3, wherein said fluid return structure further comprises at least one passage in said bearing housing providing further communication between said impeller chamber and said rotor chamber.

5. The brushless pump motor according to claim 1, wherein said fluid return structure comprises at least one passage in said bearing housing providing communication between said impeller chamber and said rotor chamber.

6. The brushless pump motor according to claim 1, wherein said hollow portion of said shaft is in open communication with said low pressure portion of said impeller chamber thereby defining said fluid return structure.

7. The brushless pump motor according to claim 2, wherein said hollow portion of said shaft is in open communication with said low pressure portion of said impeller chamber thereby defining said fluid return structure,
    said flow path structure includes at least a first passage through said bearing housing in communication with a first passage through said laminations of said stator assembly, said first passage in said laminations communicating with a water channel defined in said electronic control unit, said water channel communicating with a second passage in said laminations which in turn communicates with a second passage in said bearing housing, said second passage in said bearing housing communicating with said rotor chamber,
    whereby fluid flows from the high pressure portion of the impeller chamber through said first passage in said bearing structure, through said first passage in the laminations to said water channel and into said second passage in said laminations to said second passage in said bearing housing, into said rotor chamber to contact said wall of the partition structure and said upper surface of said electronic control unit, fluid passes through said hollow portion of said shaft to said low pressure portion of said impeller chamber.

8. The brushless pump motor according to claim 2, wherein said hollow portion of said shaft is in open communication with said low pressure portion of said impeller chamber thereby defining said fluid return structure, and said motor assembly includes a water jacket adjacent to said stator assembly, said fluid flow path structure includes, in said water jacket, a first passage in communication with said high pressure portion of said impeller chamber, a water channel communicating with said first passage, and second passage structure generally adjacent said stator assembly and in communication with said rotor chamber, whereby fluid flows from said high pressure portion of said impeller chamber to the first passage, to the water channel, into the second passage structure and into the rotor chamber to contact said wall of the partition structure and the upper surface of the electronic control unit, fluid passes into the hollow portion of the shaft to cool the bearing structure and return to the low pressure portion of the impeller chamber.

9. The brushless pump motor according to claim 8, wherein said fluid return structure further comprises at least one passage in said rotor assembly providing further communication between said impeller chamber and said rotor chamber.

10. The brushless pump motor according to claim 2, wherein said hollow portion of said shaft is in open communication with said low pressure portion of said impeller chamber thereby defining said fluid return structure, said flow path structure including a passage in said bearing housing providing fluid communication between said high pressure portion of said impeller chamber and said rotor chamber such that fluid enters said rotor chamber and contact said partition structure wall and contact said upper surface of said electronic control unit and then exit through said hollow portion of said shaft to the low pressure portion of said impeller chamber.

11. The brushless motor according to claim 1, wherein windings of said stator assembly are electrically connected said electronic control unit by a tab-socket connection.

12. The brushless motor according to claim 11, wherein said tab-socket connection includes a tab coupled to a socket, an end of said windings being coupled to said tab and said tab being engaged with said socket which is coupled to said electronic control unit.

13. A brushless electric motor comprising:
a stator assembly having laminations and windings, and an interior portion defining a rotor chamber,
a rotor assembly in said rotor chamber,
partition structure between said rotor assembly and said stator assembly for isolating said stator assembly from said rotor chamber, said partition structure having a wall in communication with said rotor chamber,
a shaft on which said rotor assembly is mounted, said shaft including a hollow portion in open communication with said rotor chamber, and
bearing structure operatively associated with the hollow portion of said shaft for supporting said shaft for rotational movement, an electronic control unit coupled to said stator assembly and having an upper surface in communication with said rotor chamber, fluid flow path structure constructed and arranged to permit cooling fluid to pass from an inlet to said rotor chamber so that said rotor assembly being submergible in the fluid such that fluid contacts said upper surface of said electronic control unit to cool the electronic control unit, and fluid contacts said wall of the partition structure so that said wall is in heat exchange relation with said fluid to cool said laminations and said windings, and fluid enters said hollow portion of said shaft to cool said bearing structure, and fluid return structure for permitting fluid in said rotor chamber to pass to an outlet defined in the motor.

14. The brushless electric motor according to claim 13, in combination with a pump, said pump having a pump housing defining an impeller chamber, an impeller being disposed in said impeller chamber said impeller being coupled to said shaft, said impeller chamber being in fluid communication with said inlet and said outlet of the motor.

15. The brushless electric motor/pump combination according to claim 14, wherein a bearing housing houses said bearing structure, said bearing housing having a generally cylindrical wall portion, said rotor assembly being disposed in an interior portion defined by said cylindrical wall, said cylindrical wall defining said partition structure.

16. The brushless electric motor/pump combination according to claim 15, wherein said hollow portion of said shaft is in open communication with said impeller chamber thereby defining said fluid return structure, and said flow path structure includes at least one passage through said bearing housing in communication with a passage through said laminations of said stator assembly that communicates with a port in said electronic control unit, said port being in open communication with said upper surface thereof and thus with said rotor chamber, whereby fluid flows from the impeller chamber and through said passage in said bearing housing, through said passage in the laminations to said port and into said rotor chamber to contact said partition structure wall and the upper surface of said electronic control unit, and fluid passes to said hollow portion of said shaft and to said impeller chamber.

17. The brushless electric motor/pump combination according to claim 16, wherein said fluid return structure further comprises at least one passage in said bearing housing providing further communication between said impeller chamber and said rotor chamber.

18. The brushless electric motor/pump combination according to claim 15, wherein said fluid return structure comprises at least one passage in said bearing housing providing communication between said impeller chamber and said rotor chamber.

19. The brushless electric motor/pump combination according to claim 13, wherein said hollow portion of said shaft is in open communication with said impeller chamber thereby defining said fluid return structure.

20. The brushless electric motor/pump combination according to claim 15, wherein said hollow portion of said shaft is in open communication with said impeller chamber thereby defining said fluid return structure, said flow path structure includes a first passage through said bearing housing in communication with a first passage through said laminations of said stator assembly, said first passage in said laminations communicating with a water channel defined in said electronic control unit, said water channel communicating with a second passage in said laminations which in turn communicates with a second passage in said bearing housing, said second passage in said bearing housing communicating with said rotor chamber, whereby fluid flows from the impeller chamber through said first passage in said bearing structure, through said first passage in the laminations to said water channel and into said second passage in said laminations to said second passage in said bearing housing, into said rotor chamber to contact said wall of the partition structure and said upper surface of said electronic control unit, fluid passes through said hollow portion of said shaft to said impeller chamber.

21. The brushless electric motor/pump combination according to claim 15, wherein said hollow portion of said shaft is in open communication with said impeller chamber thereby defining said fluid return structure, and said motor assembly includes a water jacket adjacent to said stator assembly, said fluid flow path structure includes, in said water jacket, a first passage in communication with said impeller chamber, a water channel communicating with said first passage, and second passage structure generally adjacent said stator assembly and in communication with said rotor chamber, whereby fluid flows from said impeller chamber to the first passage, to the water channel, into the second passage structure and into the rotor chamber to contact said wall of the partition structure and the upper surface of the electronic control unit, fluid passes into the hollow portion of the shaft to cool the bearing structure then return to the impeller chamber.

22. The brushless electric motor/pump combination according to claim 21, wherein said fluid return structure further comprises at least one passage in said rotor assembly providing further communication between said impeller chamber and said rotor chamber.

23. The brushless electric motor/pump combination according to claim 15, wherein said hollow portion of said shaft is in open communication with said impeller chamber thereby defining said fluid return structure, said flow path structure including a passage in said bearing housing providing fluid communication between said impeller chamber and said rotor chamber such that fluid enters said rotor chamber and contact said wall of the partition structure and contact said upper surface of said electronic control unit and then exit through said hollow portion of said shaft to said impeller chamber.

24. A method of cooling a pump motor, the pump motor including a pump housing having an impeller chamber with an impeller in said impeller chamber, a motor assembly coupled to said pump housing; said motor assembly being brushless and including: a stator assembly having laminations and windings, said stator assembly having an interior portion defining a rotor chamber, a rotor assembly in said rotor chamber, partition structure between said rotor assembly and said stator assembly for isolating said stator assembly from said rotor chamber, said partition structure including a wall in communication with said rotor chamber, a shaft on which said rotor assembly and impeller are mounted, said shaft including a hollow portion in open communication with said rotor chamber, and bearing structure operatively associated with the hollow portion of said shaft for supporting said shaft for rotational movement, the pump motor further including an electronic control unit coupled to said motor assembly and having an upper surface in communication with said rotor chamber; fluid flow path structure constructed and arranged to permit fluid to communicate between said impeller chamber and rotor chamber, and fluid return structure providing fluid communication between said rotor chamber and said impeller chamber, the method including:

permitting fluid from a high pressure portion of said impeller chamber to move through said flow path structure to said rotor chamber such that said rotor assembly is submerged in the fluid and fluid contacts said wall of the partition structure such that said wall is in heat exchange relation with the fluid to cool said laminations and said windings, the fluid contacting said upper surface of the electronic control unit to cool the same, permitting fluid to pass to said hollow portion of said shaft to cool said bearing structure, and permitting fluid to pass through said fluid return structure to return fluid in said rotor chamber to a low pressure portion of said impeller chamber.

\* \* \* \* \*